United States Patent [19]

Hendy et al.

[11] Patent Number: 4,714,725

[45] Date of Patent: Dec. 22, 1987

[54] MEMBRANES

[75] Inventors: Brian N. Hendy, Middlesbrough; John W. Smith, Liverpool, both of England

[73] Assignee: Imperial Chemical Industries PLC, London, England

[21] Appl. No.: 35,235

[22] Filed: Apr. 6, 1987

Related U.S. Application Data

[63] Continuation of Ser. No. 793,756, Nov. 1, 1985, abandoned.

[30] Foreign Application Priority Data

Nov. 12, 1984 [GB] United Kingdom ............... 8428525

[51] Int. Cl.$^4$ .................. C08K 5/15; C08L 71/04
[52] U.S. Cl. .................... 524/108; 521/64; 521/27; 524/205; 524/259; 524/475; 524/465; 524/321; 524/377; 524/390; 524/592; 264/216; 210/651; 210/654
[58] Field of Search .......... 524/108, 205, 259, 592, 524/465, 321, 377, 390; 521/64, 27

[56] References Cited

U.S. PATENT DOCUMENTS

| | | | |
|---|---|---|---|
| 3,855,122 | 12/1974 | Bourganel | 210/23 |
| 3,875,096 | 4/1975 | Graefe | 524/108 |
| 4,008,203 | 2/1977 | Jones | 524/259 |
| 4,029,582 | 6/1977 | Ishii | 210/500 M |
| 4,268,650 | 5/1981 | Rose | 525/534 |
| 4,419,486 | 12/1983 | Rose | 525/534 |

OTHER PUBLICATIONS

D. R. Lloyd, "Poly(aryether) Membranes for Reverse Osmosis", ACS Symposium Series 153, Synthetic Membranes, vol. 1, Desalination, 1981; edited, A. F. Turbak, pp. 327–349.

*Primary Examiner*—C. Warren Ivy
*Attorney, Agent, or Firm*—Cushman, Darby & Cushman

[57] ABSTRACT

Solutions of sulphonated polyaryletherketones in a solvent mixture of at least three liquids or low melting solids which are non-solvents or poor solvents for the polymer, can be used to produce asymmetric semipermeable membranes. The polymer may be a polymer of

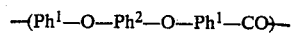

and optionally

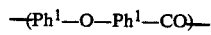

and

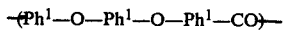

wherein $Ph^1$ and $Ph^2$ are respectively unsulphonated and sulphonated phenylene residues. The components of the solvent mixture have specified solubility parameters. A suitable solvent mixture is one formed from water, 1,4-dioxane and acetonitrile.

7 Claims, 1 Drawing Figure

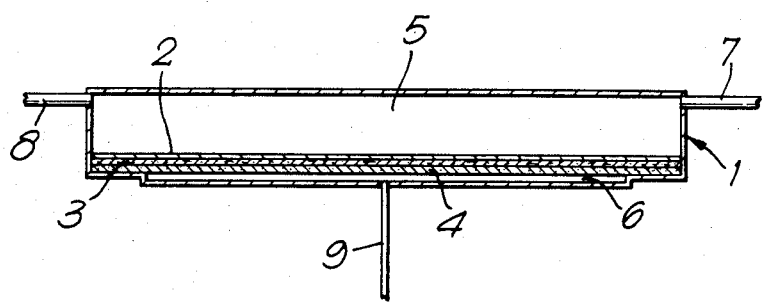

MEMBRANES

This is a continuation of application Ser. No. 793,756, filed 11-1-85, which was abandoned upon the filing hereof.

This invention relates to membranes and more particularly to a method for the preparation of asymmetric semi-permeable membranes of sulphonated polyaryletherketones.

It is known to make asymmetric semi-permeable membranes, which are useful in separation processes such as reverse osmosis and ultrafiltration, by casting a solution of a film-forming ion-exchange material on a support and then coagulating the film using a non-solvent for the ion-exchange material. Membranes of this type are characterised by having a thin dense layer which functions as the active layer of the membrane and a thicker porous layer which functions as a reinforcing support for the active layer. Sulphonated polyarylethers such as polyaryletherketones have been disclosed as being suitable materials for the production of such membranes.

For the preparation of a solution of a sulphonated polyarylether various known solvents for the polymer have been proposed, especially aprotic polar solvents such as dimethylformamide and dimethylsulphoxide. Whilst such solvents can be used singly, it is desirable for the casting solution to contain a mixture of solvents and/or swelling agents and also a non-solvent for the polymer, for example water, to facilitate coagulation of the polymer film and formation of the aforementioned asymmetric structure.

It has now been found that membranes having a useful combination of flux and salt rejection properties may be obtained using solutions of sulphonated polyaryletherketones in a solvent mixture formed from specified components.

Accordingly one aspect of the invention provides a solution comprising a sulphonated polyaryletherketone and a solvent mixture which contains at least three components each of which is a non-solvent or poor solvent for the sulphonated polyaryletherketone and which are (a) a liquid or a low melting solid containing at least one hydroxylic group and having a delta-H with a value of at least 8;

(b) a liquid or a low melting solid having a delta-D with a value of at least 8 and a delta-P with a value of not more than 3; and (c) a liquid or a low melting solid having a delta-P with a value of at least 8.5 and a delta-H with a value of not more than 3;

wherein the solvent mixture forms a single liquid phase and none of the components of the solvent mixture reacts or complexes with another of the components of the solvent mixture or with the sulphonated polyaryletherketone.

For convenience hereafter, the sulphonated polyaryletherketone will be referred to as the "sulphonated polyketone".

By "low melting solid" is meant a material which is solid at ambient temperature and has a melting point of not more than 50° C.

The solutions of the invention may be used for the production of asymmetric semi-permeable membranes.

Thus, as a further aspect of the invention there is provided a process for the production of an asymmetric semi-permeable membrane of a sulphonated polyaryletherketone, by casting a solution of a sulphonated polyaryletherketone in a solvent mixture onto a support to form a layer of solution on the support, immersing the support and layer in a coagulation bath and recovering a membrane, wherein the solution is as hereinbefore described.

The sulphonated polyketone may be any known sulphonated polyketone and, in particular, may be a material which contains repeat units of the formula

$$[Ph-O_mPh-CO] \quad \text{I}$$

wherein

Ph represents a phenylene residue, preferably a para-phenylene residue, wherein at least some of the groups Ph are sulphonated; and m is 1 or 2 and the value of m can differ along the polymer chain.

The sulphonated polyketone may be a material consisting of repeat units of formula I in which the value of m is only one or is only two or in which the value of m differs along the polymer chain and is both one and two at various points along the chain. Thus the sulphonated polyketone may be a material obtained by sulphonating a ketone polymer having only the repeat units

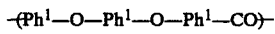

$$-(Ph^1-O-Ph^1-O-Ph^1-CO)- \quad \text{IA}$$

or only the repeat units

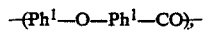

$$-(Ph^1-O-Ph^1-CO)- \quad \text{IB}$$

wherein $Ph^1$ is a phenylene residue, preferably a para-phenylene residue.

Alternatively, the sulphonated polyketone may be obtained by sulphonating a copolymer having both the repeat units IA and the repeat units IB. In the polyketone which is to be sulphonated and which contains repeat units IA and/or repeat units IB, it is preferred that the groups $Ph^1$ are para-phenylene groups.

Sulphonated polyketones which may be used to form the solution of the invention are described in the prior art, for example in European Patent Specifications Nos. 8895 and 41780. Thus, it is possible to use the products obtained by sulphonating a polymer having the repeat units of the formula IA, optionally together with other repeat units. Sulphonation of such polymers may be effected by dissolving the ketone polymer in concentrated sulphuric acid (98% w/w) and agitating the solution until the polymer has been sulphonated to a desired extent. The sulphonation is concentrated sulphuric acid may be carried out at ambient temperature or at an elevated temperature, for example at least 50° C., depending on the ketone polymer to be sulphonated. Alternatively, polymers of repeat units IB may be sulphonated by the procedures described in Journal of Polymer Science, Polymer Chemistry Edition, Vol 23 (1985) pages 2205 to 2223.

The ketone polymer which is sulphonated is preferably one containing the repeat units of the formula 1A only or a copolymer containing the repeat units of the formula 1A together with comonomer units of the formula

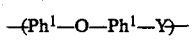

$$-(Ph^1-O-Ph^1-Y)- \quad \text{II}$$

or comonomer units of the formula

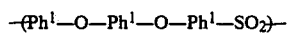

where
Ph¹ is as defined; and
Y is a —CO— or —SO₂— group, and the nature of Y in the units of formula II may vary.

In the copolymers it is preferred that the proportion of the repeat units of formula II or III does not exceed 50% mole of the copolymer.

In the sulphonation process, sulphonation occurs readily on the sub-group —O—Ph¹—O— in the repeat units of formula 1A, and most readily on these sub-groups in the repeat units of formula III. The preferred ketone polymers which are sulphonated contain at least 50 mole % of the repeat units of formula 1A and are especially homopolymers of the repeat units 1A or copolymers of the repeat units 1A and repeat units II, particularly when the group Y is —CO—.

Preferred sulphonated polymers used in accordance with the present invention contain the repeat units

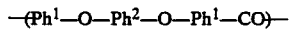

optionally together with the repeat units II and also the repeat units IA,
wherein
Ph¹ is as defined;
Ph² is a phenylene residue, preferably a para-phenylene residue, containing one or two groups SO₃M;
M is a hydrogen atom, a metal atom or a group NR₄, wherein the groups M may be the same or different and the proportion of the groups M is sufficient to combine with the unsatisfied valencies of the group —SO₃; and
R is a hydrogen atom or an alkyl group.

The repeat units IA are present due to incomplete sulphonation of the polymer containing the repeat units IA. Preferably, the sulphonated polymer contains both repeat units IA and repeat units IV and is one in which the repeat units IV are at least 35 mole % and not more than 80 mole %, and preferably 40 to 70 mole %, of the total of the repeat units IV, and the repeat units IA. The group M is typically a hydrogen atom since this is the usual product of the sulphonation step.

The sulphonated polyketones are polymeric materials of high molecular weight, as indicated by the reduced viscosity (RV) or inherent viscosity (IV) of the polymer. The polymers having a low degree of sulphonation are not readily soluble in many organic solvents and the RV or IV is measured in concentrated sulphuric acid (98% w/w). Preferably, the polymers having a low degree of sulphonation have an IV (measured at 25° C. in a 0.1% w/w solution of the polymer in concentrated sulphuric acid) of at least 0.2 and preferably of at least 0.4. The IV of such polymers typically does not exceed 2.5 and especially does not exceed 2.0. Preferred sulphonated polyketones have a degree of sulphonation which is such that the sulphonated polyketone is soluble in organic solvents such as dimethylformamide. Such sulphonated polymers preferably have an RV (measured at 25° C. in a 1.0% w/w solution of the polymer in dimethylformamide) of at least 0.2 and preferably of at least 0.4. The RV of such polymers preferably does not exceed 2.5 and especially does not exceed 2.0.

The sulphonated polyketones are conveniently prepared by sulphonation of polyketones using the procedures described herein and in European Patent Specification Nos. 8895 and 41780. Polyketones which are less readily sulphonated than those used in the processes of European Patent Specification Nos. 8895 and 41780 may be sulphonated using more powerful sulphonation agents, for example by the procedures of Journal of Polymer Science, Polymer Chemistry Edition, Vol 23 (1985) pages 2205 to 2223. The polyketones which are sulphonated are suitably crystalline polymers containing the repeat units IA alone or together with other repeat units and having an IV (measured at 25° C. in a 0.1% w/w solution of the polymer in concentrated sulphuric acid) of at least 0.7. Such polymers are more fully described in European Patent Specification 1879.

In the sulphonated polyketone containing the repeat units of the formula IV, when Ph² is an ortho- or para-phenylene residue, there is typically only one group —SO₃M whereas when Ph² is a meta-phenylene residue there may be one or two groups —SO₃M depending on the time and temperature of sulphonation. When Ph² is an ortho-phenylene residue, the —SO₃M group is located in a position which is para- to one ether group and meta- to the other ether group, any further sulphonation occuring to locate the —SO₃M in positions meta- to each other. When Ph² is an ortho-phenylene residue, the —SO₃M group is located in a position ortho- to one ether group and meta- to the other ether group. When Ph² is a meta-phenylene residue, the —SO₃M group or groups is or are located in the positions ortho- to one ether group and para- to the other ether group.

In the solvent mixture, delta-H, delta-D and delta-P are components of the solubility parameter of each material which is a component of the solvent mixture and are related by the expression $$(\text{delta-}O)^2 = (\text{delta-}H)^2 + (\text{delta-}D)^2 + (\text{delta-}P)^2$$

where delta-O is the solubility parameter and is given by the expression $$(\text{delta-}O) = \left(\frac{\Delta E_v}{V}\right)^{\frac{1}{2}}$$

where
$\Delta E$ is the molar cohesive energy which approximates to $\Delta H$-RT;
$\Delta H^v$ is the latent heat of vaporisation;
R is the gas constant;
T is the absolute temperature and;
V is the molar volume.

More specifically, delta-H is the hydrogen bonding component of the solubility parameter, delta-D is the dispersion component of the solubility parameter and delta-P is the polar component of the solubility parameter.

The concept of solubility parameters is discussed in many papers in the scientific literature including, inter alia, a paper by C M Hansen in Ind Eng Chem Prod Res Dev 8 March 1969, pages 2 to 11. Other papers in which solubility parameters are considered are, inter alia, Chemical Reviews, 75 (1975), pages 731 to 753, and KirkOthmer "Encyclopedia of Chemical Technology" Second Edition, Supplemental Volume (1971) pages 889 to 910.

A tabulation of values of delta-H, delta-D and delta-P is given in the Hansen paper and these values may be used to determine suitable materials for use as components (a), (b) and (c) of the solvent mixture.

Preferred materials for use as component (a) of the solvent mixture have a delta-H of at least 8, a delta-D of not more than 8 and a delta-P of at least 6. Especially preferred materials have a delta-H of greater than 10, a delta-D of less than 8 and a delta-P of at least 6. From the Hansen paper, few materials have a delta-H of the required value and only diethylene glycol, dipropylene glycol, methanol and water satisfy the requirements for the preferred materials.

Preferred materials for use as component (b) of the solvent mixture have a delta-D with a value of at least 8, a delta-P of not more than 3 and a delta-H of not more than 4. Materials satisfying the preferred requirements include, inter alia, 1,4-dioxane, and several halohydrocarbons. Many hydrocarbons, particularly cyclic hydrocarbons, have the preferred values of delta-D, delta-P and delta-H but do not form a single phase mixture with most materials used as components (a) and (c) of the solvent mixture.

Preferred materials for use as component (c) of the solvent mixture have a delta-P of at least 8.5, a delta-H of not more than 3 and a delta-D of at least 7.5. Materials satisfying the preferred requirements include, inter alia, propylene carbonate, ethylene carbonate, acetonitrile and nitromethane.

The components of the solvent mixture are non-solvents or poor solvents for the sulphonated polyketone and the polymer is typically soluble in each of the components in an amount of not more than 5% by weight, preferably less than 1% by weight, especially less than 0.1% by weight.

The sulphonated polyketone is preferably soluble in the solvent mixture in an amount of at least 10% by weight, more preferably at least 15% by weight, especially at least 20% by weight, for example 25 to 30% by weight. The quantity of polymer dissolved in the solvent mixture should be such that the resulting solution can be cast into a membrane and this will be dependent not only on the components of the solvent mixture but also on the molecular weight of the polymer and the degree of sulphonation of the polymer.

The components of the solvent mixture, and the properties thereof, are preferably such that the solvent mixture has a delta-H of value in the range from 2 to 12; a delta-P of value in the range from 4 to 9 and a delta-D of value in the range from 6.5 to 9.5. We have found that the preferred values of delta-H, delta-P and delta-D are dependent on the nature of the sulphonated polyketone and when M is hydrogen, the preferred solvent mixture has a delta-H of 3 to 6; a delta-P of 4 to 9 and a delta-D of 7.5 to 9. When divalent metal salt is being used, the preferred solvent mixture has a delta-H of 3 to 8; a delta-P of 4 to 9 and a delta-D of 7.5 to 9.5.

Solvent mixtures which may be used in accordance with the the present invention include the systems.

(a) $R^1OH$ or $R^1COOH$, where $R^1$ is a hydrogen atom or a hydrocarbyl group;
(b) an ether, particularly a cyclic ether; and
(c) a non-basic nitrogen—containing compound.

As an example of such a system there may be mentioned water, 1,4-dioxane and acetonitrile.

In the materials of the type $R^1OH$ and $R^1COOH$, it is preferred that $R^1$ is a lower alkyl group, that is one containing 1 to 6 carbon atoms, or is especially hydrogen. Component (a) is preferably a compound of the formula $R^1OH$ and, in particular, component (a) is water.

The solvent mixture consists of at least the three components (a), (b) and (c), and for some systems four or more components may be present. However, for convenience of preparing the solvent mixture, it is preferred to minimise the number of component and hence the solvent mixture typically consists of three components.

A wide range of solvent mixtures can be used. For sulphonated polyketones as disclosed in European Patent Specification 8895, we have obtained a solvent mixture having satisfactory characteristics from a mixture consisting of water, 1,4-dioxane and acetonitrile. This mixture suitably contains at least 20% by weight of 1,4-dioxane, at least 10% by weight of acetonitrile and not more than 40% by weight of water, the total amounts of the three components aggregating to 100% by weight. We particularly prefer that the mixture contains 20 to 35% by weight of water, 20 to 50% by weight of acetonitrile and 15 to 60% by weight of 1,4-dioxane, the total amounts of the three components aggregating to 100% by weight.

Solutions in accordance with the present invention can be used for the production of membranes by casting the solution onto a support. For use in such a process, it is very desirable that at least one component of the solvent mixture is volatile and evaporates, at least partially, during the casting of the solution and/or the production of the supported layer of the cast solution. It is also desirable that the sulphonated polyketone is insoluble, or of reduced solubility, in the residue of the solvent mixture which remains after the volatile component, or components, have evaporated.

The most suitable mixtures for any particular sulphonated material depend not only on the basic polymer structure, that is the unsulphonated material, but also upon the degree of sulphonation of the polymer. By "degree of sulphonation" we mean the ratio of the number of sulphonated phenylene residues in the sulphonated polymer to the number of unsulphonated phenylene residues in the sulphonated polymer. The degree of sulphonation can be determined by titration. In general, polymers having lower degrees of sulphonation require solvent mixtures in which the value of delta-H and delta-P for the solvent mixture is reduced. For the solvent mixture 1,4-dioxane, acetonitrile and water, this is achieved with a mixture having a lower water content and a higher acetonitrile content. The most suitable mixtures for any given sulphonated polymer can be readily ascertained by trial. Thus, we have found that with a sulphonated polyketone containing the repeat units IV and IA, as specified herein, wherein the proportion of the repeat units IV is sufficient to give a degree of sulphonation of 1:5, that is with 50% mole of repeat units IV and 50% mole of repeat units IA, preferred mixture consists of 1,4-dioxane, acetonitrile and water in the weight ratios 3:2:2.

The solution may be prepared by dissolving the sulphonated polyketone in any suitable form, for example powder, chips, granules, in the mixed solvent to form a solution containing from 10% to 40% by weight of the sulphonated polyketone. Dissolution of the polymer and casting on to the support may be effected at ambient temperature but lower or higher temperatures may be used if desired, for example from 0° C. to 100° C.

The solution of the present invention may also include a swelling agent. A wide range of swelling agents may be used, for and these are typically water soluble compounds, especially bifunctional carboxylic acids.

Maleic acid is a suitable swelling agent. The amount of the swelling agent is dependent on the particular swelling agent, the sulphonated polyketone and the solvent mixture but generally will be at least 1% by weight and not more than 10% by weight of the composition (swelling agent, sulphonated polyketone and solvent mixture).

The solution of the sulphonated polyketone is formed into a membrane by casting on a support. Casting onto the support may be effected at essentially ambient temperature but lower or higher temperatures may be used if desired. The support may be for example a non-porous plane surface such as a glass or metal plate or, alternatively, may be a porous support such as a fabric and, where appropriate, it may have some other shape. Sufficient of the solution is cast on to the support in conventional manner to give a film of the desired thickness which may be adjusted as necessary by suitable mechanical means. It is preferred to produce a film having a thickness of at least 20 micrometers and not more than 300 micrometers, most preferably from 50 up to 250 micrometers, and especially from 75 to 200 micrometers. Alternatively, fine hollow fibres may be produced by extruding the solution through a die having a central mandrel, allowing some of the solvent to evaporate and then passing the fibres through a coagulation bath.

It is advantageous to allow at least partial evaporation of at least one component of the solvent mixture from the supported liquid film by exposing the latter to the atmosphere for a short time, 10 seconds to 5 minutes, before immersing the supported film in a coagulation bath. The coagulation bath may contain an aqueous solution, for example a solution of an inorganic salt such as sodium chloride or sodium nitrate, or may be a non-solvent liquid, or liquid mixture, for example formed from one or more of the components of the solvent mixture. Preferably the coagulation bath is an aqueous solution of a metal salt such as sodium chloride or sodium nitrate. To obtain a membrane of a higher flux, the coagulation bath may be a mixture of water and either component (b) or component (c) of the solvent used in casting the membrane. The temperature of the coagulation bath is generally between $-20°$ C. and $60°$ C., and is preferably below $5°$ C. The coagulation treatment may be between 1 minute and several hours, for example between 5 and 60 minutes.

After the coagulation treatment, the membrane is recovered. In the case of a non-porous support, the membrane is detached from the support but, in the case of a porous support, the membrane remains adhered to the support. The recovered membrane may be subjected to heat treatment in order to relax the structure. Such a heat treatment preferably includes an immersion in an aqueous solution of an inorganic salt at an elevated temperature, typically from $70°$ C. to $150°$ C. This heat treatment may be effected with the membrane being held under pressure (4 to $100kN/m^2$) between porous supports, such as porous graphite, sintered stainless steel or filter paper or a non-porous support. Once prepared, and after any heat treatment, the membrane is preferably washed with distilled water to remove free ionic spaces and is then stored in distilled water until required.

Membranes obtained by the method of the invention may be used for the treatment of a wide variety of aqueous or non-aqueous solutions or suspensions by conventional reverse osmosis or ultrafiltration techniques. In particular they may be used for the desalination of sea water and for the purification of brackish waters and industrial effluents.

To reduce the possibility of variations in membrane properties, it is desirable that all stages in the preparation of the casting solution, and the casting and coagulation steps, are effected under carefully controlled conditions of time, temperature and humidity. During the casting and subsequent evaporation, it is preferred that the humidity does not exceed about 65% relative humidity, for example in the range 35 to 50% relative humidity.

The accompanying drawing is a diagrammatic representation of a reverse osmosis cell in which the membranes of the present invention may be used.

The cell comprises a closed vessel 1 which is divided into two sections internally by a membrane 2. The membrane 2 is in contact with a sheet 3 of a porous material for example filter paper and sheet 3 is supported by a porous plate 4 which is not semi-permeable and which assists in preventing mechanical deformation of the membrane 2. The membrane 2, the sheet 3 and porous plate 4 are clamped at their edges to prevent leaking around the edges. The vessel 1 is divided by the membrane 2 into a large section 5 and a small section 6. The large section 5 is provided with two pipelines 7 and 8 for the supply and removal of liquid. The small section 6 is provided with a pipeline 9. In use, liquid under pressure, for example sea water at a pressure of $4MNm^{-2}$, is passed into section 5 of the vessel 1 through pipeline 7 and is withdrawn through pipeline 8. The pressure is sufficient to cause reverse osmosis and some water passes through the membrane 2 into the section 6 from which it is withdrawn through the pipeline 9. The apparatus can be operated at ambient temperature (about $25°$ C.) but higher temperatures may be used. In a continuous process, a further pipeline may be connected to section 6 of the vessel 1 whereby a continuous flow of a carrier liquid, which is the liquid being collected, is passed through section 6. Other modifications and variations may be effected in the manner known to those skilled in the art.

Various aspects of the present invention are illustrated, but not limited, by the following Example, in which all parts and percentages are by weight unless otherwise indicated.

EXAMPLE

A sample of powder of polyetheretherketone of repeat unit IA and having a melt viscosity (measured using a ram extruder fitted with a $3.175 \times 0.5$ mm die and operating at $400°$ C. and a shear rate of $1000s^{-1}$) of 0.33 (this melt viscosity corresponds to an IV of about 0.95 as measured at $25°$ C. using a 0.1% w/w solution of the polymer in 98% w/w concentrated sulphuric acid), was dried in a vacuum oven at $120°$ C. for two hours and at $40°$ C. for 18 hours. 71.8 g of the dried polymer powder was added gradually to concentrated sulphuric acid which was being vigorously stirred. The powder was added to avoid the central vortex. Stirring was continued throughout the polymer addition and all subsequent stages. After stirring at about $21°$ C. for 149 hours, the mixture of concentrated sulphuric acid and dissolved polymer was added dropwise to stirred demineralised water and the sulphonated polyetheretherketone was precipitated.

By titration against sodium hydroxide solution it was determined that sulphonation of 73% molar of the repeat units IA had occurred to give the repeat units IV and leaving 27% molar of the repeat units IA unsulphonated.

16 g of the sulphonated polyetherketone obtained as described above were dissolved, at a temperature of 25° C., in 40 g of a 3:2:2 parts by weight 1,4-dioxane/acetonitrile/water mixture to give a solution of the sulphonated polymer in the solvent mixture. The solution was filtered through a gauze with a mesh size of 30 micrometers and then centrifuged at 2000 rpm for 20 to 30 minutes.

The solution was cast onto a glass plate and a film of 0.15 mm thickness was formed on the plate with the aid of a brass spreader. After one minute evaporation in air, coagulation of the film was effected by immersing for 30 minutes in a 5% w/w aqueous solution of sodium chloride at about 1° C. The glass plate and the membrane formed on it were removed from the sodium chloride solution and the membrane was removed from the glass plate. The membrane was washed with distilled water and the membrane was stored in distilled water until tested.

The recovered membrane was tested using an apparatus of the type hereinbefore described and in which the membrane was placed in contact with a porous support and the exposed side, being the side exposed to the air during casting, was subjected to continuous feed of an aqueous solution of sodium chloride (0.2% by weight) pumped across the surface of the membrane at a pressure of about 4MNm$^{-2}$ and a temperature of 25° C. The liquid passing through the membrane was analysed. The membrane gave a salt rejection of 63.6% as determined by measuring the conductivity of the solution feed to the membrane cell and measuring the conductivity of the solution permeating the membrane, and using the relationship $$\% \text{ salt rejection} = \left(1 - \frac{\text{conductivity of permeate}}{\text{conductivity of feed}}\right) \times 100$$

A flux of 0.8 m.day$^{-1}$ was achieved.

We claim:

1. A solution comprising a sulphonated polyaryletherketone and a solvent mixture which contains at least three components each of which is a non-solvent or poor solvent for the sulphonated polyaryletherketone and which are
   (a) a liquid or a low melting solid containing at least one hydroxylic group and having a delta-H with a value of at least 8;
   (b) a liquid or a low melting solid having a delta-D with a value of at least 8 and a delta-P with a value of not more than 3; and
   (c) a liquid or a low melting solid having a delta-P with a value of at least 8.5 and a delta-H with a value of not more than 3;
wherein the solvent mixture forms a single liquid phase and none of the components of the solvent mixture reacts or complexes with another of the components of the solvent mixture or with the sulphonated polyaryletherketone.

2. The solution of claim 1 wherein the sulphonated polyaryletherketone contains repeat units of the formula $$-\!\!\left[(\text{Ph}\!-\!\text{O})_{\overline{m}}\text{Ph}\!-\!\text{CO}\right]\!\!- \qquad \text{I}$$

wherein
Ph represents a phenylene residue wherein at least some of the groups are sulphonated; and
m is 1 or 2 and the value of m can differ along the polymer chain.

3. The solution of claim 2 wherein the sulphonated polyaryletherketone is a material in which the value of m is only one or is only two or is a material in which the value of m differs along the polymer chain and is both one and two at various points along the chain.

4. The solution of claim 1 wherein the sulphonated polyaryletherketone is the product obtained by sulphonating a polymer having the repeat units of the formula $$-\!(\text{Ph}^1\!-\!\text{O}\!-\!\text{Ph}^1\!-\!\text{O}\!-\!\text{Ph}^1\!-\!\text{CO})\!- \qquad \text{IA}$$

and optionally also including comonomer units of the formula $$-\!(\text{Ph}^1\!-\!\text{O}\!-\!\text{Ph}^1\!-\!\text{Y})\!- \qquad \text{II}$$

or comonomer units of the formula $$-\!(\text{Ph}^1\!-\!\text{O}\!-\!\text{Ph}^1\!-\!\text{O}\!-\!\text{Ph}^1\!-\!\text{SO}_2)\!- \qquad \text{III}$$

wherein
Ph$^1$ is a phenylene residue; and;
Y is a —CO— or —SO$_2$— group, and the nature of Y in the units of formula II may vary.

5. The solution of claim 1 in which component (a) of the solvent mixture has a delta-H of at least 8, a delta-D of not more than 8 and a delta-P of at least 6; component (b) of the solvent mixture has a delta-D of at least 8, a delta-P of not more than 3 and a delta-H of not more than 4; and component (c) of the solvent mixture has a delta-P of at least 8.5, a delta-H of not more than 3 and a delta-D of at least 7.5.

6. The solution of claim 5 wherein the solvent mixture contains at least 20% by weight of 1,4-dioxane, at least 10% by weight of acetonitrile and not more than 40% by weight of water, the total amounts of the three components aggregating to 100% by weight.

7. The solution of claim 1 wherein at least one component of the solvent mixture is volatile and evaporates, at least partially, during casting of the solution.

* * * * *